(12) United States Patent
Kumarasamy et al.

(10) Patent No.: US 8,331,352 B2
(45) Date of Patent: Dec. 11, 2012

(54) INTERWORKING SUPPLEMENTARY CALL SERVICES BETWEEN DIFFERENT COMMUNICATION PROTOCOLS

(75) Inventors: Parameswaran Kumarasamy, San Jose, CA (US); Paul R. P. Chu, Saratoga, CA (US); Jayesh Chokshi, Cupertino, CA (US); Sunila R. Ainapure, Sunnyvale, CA (US); Sandeep Singh Kohli, Fremont, CA (US); Sabita Jasty, San Jose, CA (US); Vijay Kannan, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1525 days.

(21) Appl. No.: 11/671,351

(22) Filed: Feb. 5, 2007

(65) Prior Publication Data
US 2008/0186954 A1    Aug. 7, 2008

(51) Int. Cl.
*H04L 12/66* (2006.01)
(52) U.S. Cl. .......................... 370/352; 370/385; 370/467
(58) Field of Classification Search .......................... None
See application file for complete search history.

(56) References Cited

U.S. PATENT DOCUMENTS

2001/0046234 A1* 11/2001 Agrawal et al. ............... 370/402
2007/0086432 A1* 4/2007 Schneider et al. ............ 370/352

OTHER PUBLICATIONS

Sparks, R. The Session Initiation Protocol (SIP) Refer Method. Network Working Group. RFC 3515. dyanimcsoft, Apr. 2003.*
Mahy, R. et al. The Session Initiation Protocol (SIP) "Replaces" Header. Network Working Group. RFC 3891. Cisco Systems, Inc., Sep. 2004.*

* cited by examiner

*Primary Examiner* — Asad Nawaz
*Assistant Examiner* — Junstin N Mullen
(74) *Attorney, Agent, or Firm* — Haynes and Boone, LLP

(57) ABSTRACT

A method for interworking supplementary call services between different VOIP protocols is provided. The method comprises receiving, during a call between a first end device and a second end device, a first message in a first protocol format for the second end device to transfer the call to a third end device; determining interworking information to interwork the first message to a second message in a second protocol format; generating the second message based on the interworking information, such that the second message initiates the call transfer to the third end device.

13 Claims, 8 Drawing Sheets

⟋500

REFER sip: 1001@1.2.177.60:5060 SIP/2.0
         Via: SIP/2.0/UDP 1.2.177.63:5060:branch=z9hG4bKE37DB
502⏝From:<sip:3001@1.2.177.63>tag=51F684C0-25C9
         To: <sip:1001@1.2.177.60>tag=9A282F08-D3A
         Date: Wed, 06 Apr 2005 17:59:18 GMT
         Call-ID:60E2C54E-A5FC11D9-8162C2EB-982C8879@1.2.177.60
504⏝Refer - To: sip:2001@1.2.177.60
506⏝Referred-By: sip:3001@1.2.177.63
         User-Agent Cisco-SIPGateway/IOS-12.x
         Max-Forwards:70
         Timestamp: 1112810358
         CSeq: 102 REFER
         Content-Length: 0

FIG. 5

INTERWORKING SUPPLEMENTARY CALL SERVICES BETWEEN DIFFERENT COMMUNICATION PROTOCOLS

TECHNICAL FIELD

The present invention generally relates to telecommunications and more specifically to providing an interworking solution that supports supplementary call services between end devices communicating over various communication protocols.

BACKGROUND

Voice over Internet protocol (VOIP) refers to a set of standards for communicating digitized voice in form of data over an IP-based network, such as the Internet. Current VOIP systems use different communication protocols, such as packet based telecommunication protocol H.323 and session initiation protocol (SIP), to set up calls between one or more communication endpoints. Each endpoint (i.e., end device) may communicate over a different communication protocol, such that one end device may communicate over the H.323 protocol and another end device may communicate over the SIP, for example.

To support communication between end devices that use different VOIP protocols, basic models for interworking the H.323 and SIP protocols have been implemented. Interworking refers to the process of mapping a communication method or message supported in one protocol to a corresponding communication method or message in another protocol. Thus, for example, a call between two end devices can be set up, even if one end device communicates over the H.323 and another end device communicates over the SIP.

A set of standards known as H.450 have been suggested by the International Telecommunications Union (ITU) to support supplementary services for H.323. Supplementary services include call services such as call forward, call transfer, call hold, call wait, call identification, etc. Unfortunately, the current interworking solutions support a few types of call connections and do not provide an interworking solution for supplementary services in a non-H.450 communication framework.

Accordingly, systems and methods are needed that can overcome the aforementioned shortcomings.

BRIEF DESCRIPTION OF THE DRAWINGS

Embodiments of the present invention are understood by referring to the figures in the attached drawings, a brief description of which is provided below.

FIG. 5 depicts an example of a SIP REFER message, according to one embodiment.

Features, elements, and aspects of the invention that are referenced by the same numerals in different figures represent the same, equivalent, or similar features, elements, or aspects, in accordance with one or more embodiments.

DESCRIPTION

Overview

Figure 1:
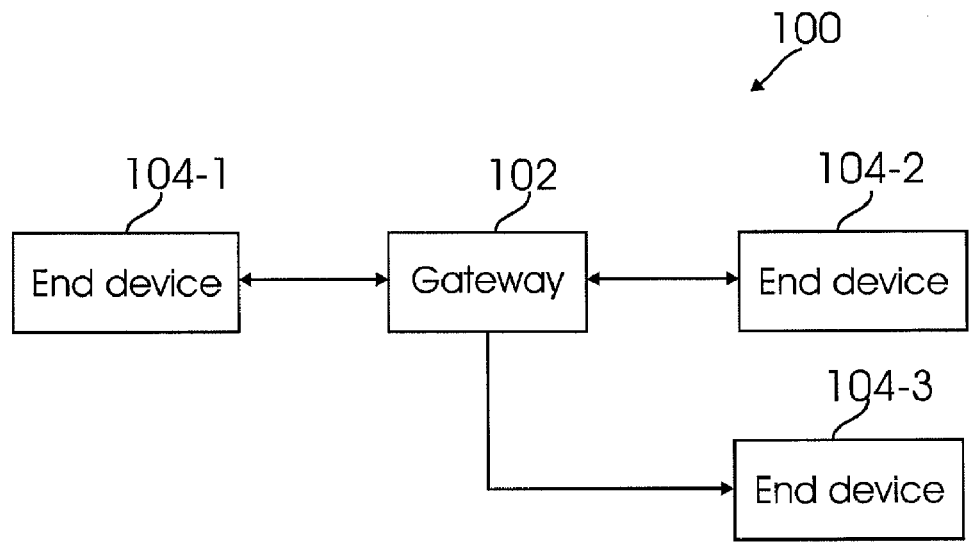
FIG. 1 depicts a simplified block diagram of a communication network, wherein two or more end devices may communicate via a gateway, according to one embodiment.

For purposes of summarizing, certain aspects, advantages, and novel features of the invention are provided below. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a first end device associated with a first user and a second end device associated with a second user may be participating in a call. During the call, the second user may wish to transfer the call to a third end device associated with a third user. As provided in further detail below, the second user may use a blind transfer or a consult transfer, for example, to establish a call between the first and third end devices.

In an exemplary embodiment, the first end device may communicate over the H.323 and the second end device may communicate over the SIP. To initiate the call transfer, the second end device, preferably, sends a SIP message to transfer the call from the first end device to the third end device. The gateway receives the SIP message and facilitates the call transfer to the third device communicating over the H.323, by determining interworking information (e.g., an identifier for the third user) for transferring the call. The gateway generates a H.323 message based on the interworking information. The message is sent to the first end device to effectuate the call transfer. The SIP message may comprise a REFER message, for example. The H.323 message may comprise an ECS message for example.

In accordance with another exemplary embodiment, to initiate the call transfer, the first end device, preferably, sends a H.323 message to transfer the call from the first end device to the third end device. The gateway receives the H.323 message and facilitates the call transfer to the third device communicating over the H.323, by determining interworking information for transferring the call. The gateway generates a SIP message based on the interworking information. The message is sent to the second end device to effectuate the call transfer. The H.323 message may comprise an ECS message, for example. The SIP message may comprise a ReINVITE message, for example.

Detailed Description of Exemplary Embodiments

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

In accordance with one aspect of the invention, systems and methods for interworking supplementary call services between various VOIP protocols are provided. In the following description, several exemplary interworking solutions are provided as applicable to a call transfer feature of the H.323 and SIP protocols. It is noteworthy, however, that this application is by way of example. Thus, the principals and the teachings of the present disclosure can be equally applied to other VOIP protocols and features without detracting from the scope of the invention.

Referring to FIG. 1, a gateway 102 and end devices 104 (e.g., 104-1, 104-2 and 104-3) communicate in a networked environment. The network environment can be established over a local or wide area topology, and the connections between the end devices in the network may be provided over wired or wireless lines or a combination of the two, and in certain embodiments over a distributed network environment.

End devices 104 are participants in one or more communication networks. Exemplary end devices 104 may comprise one or more of VOIP telephones, computers, instant messaging clients, cellular phones, soft phones, set-top boxes, smart appliances, gaming consuls or any other device that can participate in voice or data communication.

In accordance with one embodiment, end devices 104 may communicate over VOIP protocols such as H.323 or SIP. As noted earlier, the invention has been described as applicable to H.323 and SIP protocols by way of example. It is emphasized, however, that the principals and conventions disclosed here can be equally applied to other communication protocols (e.g., successor protocols or enhancements to H.323 or SIP).

In one embodiment, end device 104-1, end device 104-2, and end device 104-3 are members of the same or separate independent networks and are interconnected via gateway 102. Gateway 102 may be any network device configured to manage communications with end devices 104. Gateway 102 may comprise one or more session border controllers, SIP proxies, IP-PBXs, media gateways, soft switches, back-to-back user agents (B2BUAs), IP-to-IP gateways, etc. Gateway 102 preferably interconnects various end devices that communicate over different communication protocols.

In accordance with one aspect of the invention, gateway 102 is configured to provide interworking between different VOIP protocols, so that for example, end device 104-1 can communicate over a first protocol (e.g., H.323) and end device 104-2 can communicate over a second protocol (e.g., SIP). Gateway 102 provides interworking between different protocols such that end device 104-1 may communicate with end device 104-2, and to support supplementary call services for one or more of the end devices 104.

Gateway 102 may, for example, interwork a SIP REFER message to an empty capability set (ECS) message in the H.323 protocol, or interwork an ECS message to a SIP ReINVITE message, to effectuate a call transfer from end device 104-2 to end device 104-3. In some embodiments, a blind transfer or a consult transfer can be performed using gateway 102.

In consult transfer, the initial call is established between a first person (transferee) and a second person (transferor). The second person consults a third person (transfer-to) by calling the third person and then transfers the call, so that the first person and the third person can converse. A blind transfer is similar to the consult transfer process in that the initial call is established between the first person (transferee) and the second person (transferor) and after the transfer is committed, the first person and third person (transfer-to) can converse. In a blind transfer, however, the second person can transfer the first person to the third person without consulting the third person.

For the purpose of example, an ECS message is defined as a terminal capability set message that preferably comprises at least one of a sequence number or a protocol identifier. Using the ECS message, network elements such as gateway 102, PBXs, call centers, and IVR systems can reroute media connections independent of supplementary services and facilitate pre-connect announcements. In one embodiment, each device 104 responds to the reception of an ECS message so that gateway 102 can reroute media connections between one or more end devices 104.

In one embodiment, upon reception of an ECS message, a transmitting end device 104 enters a paused state and stops transmitting on one or more logical channels used to establish a call. Depending on implementation, end device 104 may also close one or more logical channels that were previously opened, including bidirectional logical channels, for example.

End device 104 may close a logical channel by sending a close logical channel (CLC) message. Preferably, end device 104 will request a remote end device to close remotely open logical channels, either unidirectional or bidirectional. In some embodiments, end device 104 may send an acknowledgement message (e.g., ECS_ACK or CLC_ACK), preferably, before stopping transmission to indicate that the discontinuation in transmission is intentional or confirm the close channel request.

In one embodiment, while an end device 104 is in the paused state, the end device 104 will not initiate the opening of new logical channels. End device 104 may, however, accept the opening and closing of logical channels from a remote end device and may continue to receive media on open logical channels opened by the remote end device. This allows the end device 104 to receive announcements (e.g., pre-connect call progress data) where the announcing entity does not wish to receive media.

Accordingly, a terminal capability set message, such as TCS can be used when an end device's capabilities change (i.e., when an end device 104 is in a paused state). In this manner, an end device (e.g., 104-1) can communication with another end device (e.g., 104-2), even if neither of the end devices had initially declared any capabilities for establishing a communication connection.

In some embodiments, an end device in a paused state may place another end device with which it is communicating into a paused state by transmitting an ECS message. Upon reception of the ECS message, the receiver end device will suspend communication and close one or more open logical channels. A paused end device can leave the paused state upon receiving a message indicating that its capabilities has changed and resume activity prior to entering the paused state. Thus, the released end device may reconnect to different end devices.

In one or more embodiments, unless an end device's capabilities have changed, the end device does not send a terminal capability set message to another end device to release the other end device from a paused state. In order to expedite reestablishing communication between the end devices, preferably, gateway 102 requests that the other end device to be released from the paused state.

Figure 2:
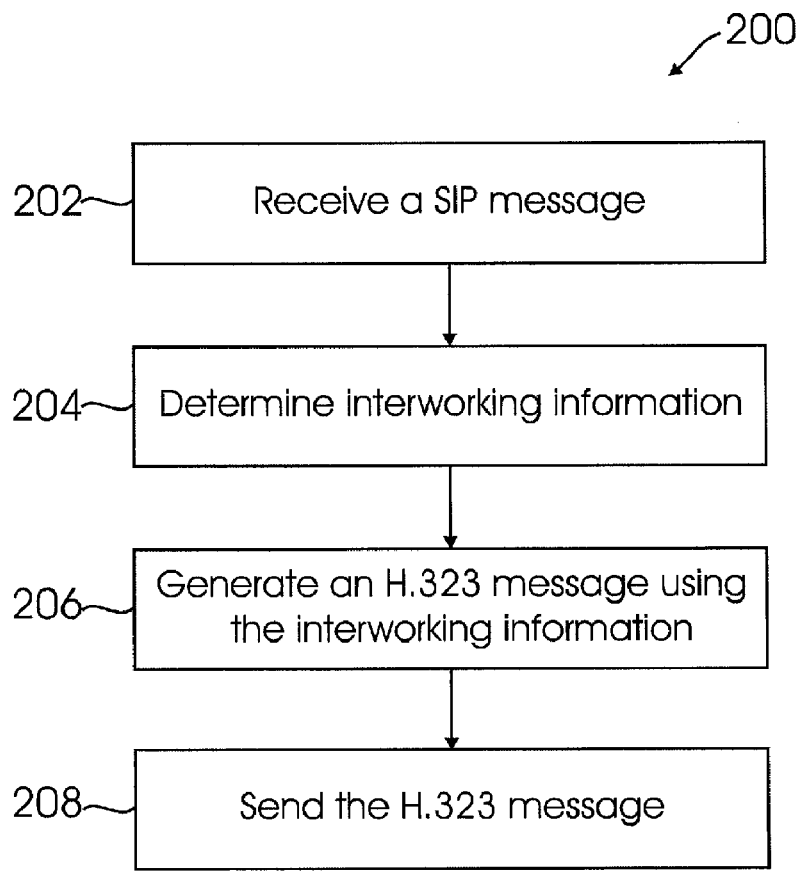
FIG. 2 depicts a simplified flowchart of a method for interworking a SIP message to a H.323 message, according to one embodiment.

Referring to FIGS. 1 and 2, an exemplary method for interworking between an H.323 protocol and a SIP protocol is provided. In accordance with one embodiment, end device 104-1 communicates over H.323 and end device 104-2 communicates over SIP. Gateway 102 acts as the intermediary between end device 104-1 and end device 104-2 to establish a communication connection between the two end devices.

After a call connection is established between end devices 104-1 and 104-2, gateway 102 may receive a SIP message from end device 104-2 to transfer the call to end device 104-3 (S202). The SIP message indicates that the recipient end device should contact a third party end device using the contact information provided in the request. Gateway 102 determines interworking information to effectuate the call transfer by releasing the connection between end devices 104-1 and 104-2, and establishing a connection between end devices 104-1 and 104-3 (S204). Since end device 104-1 and end device 104-2 communicate using different protocols, the SIP message may not be directly forwarded to end device 104-1 to initiate the transfer.

Accordingly, interworking information for carrying out the transfer is determined by gateway 102. In one embodiment, gateway 102 parses the SIP message, for example, to determine fields that include information (e.g., contact information for end device 103-3) for the transfer. Gateway 102 preferably generates an H.323 message using the interworking information (S206). The H.323 message is thus used to initiate a transfer to end device 104-3 over H.323. Gateway 102 sends the H.323 message to end device 104-1 to initiates a transfer of the call to end device 104-3 (S208).

Figure 3:
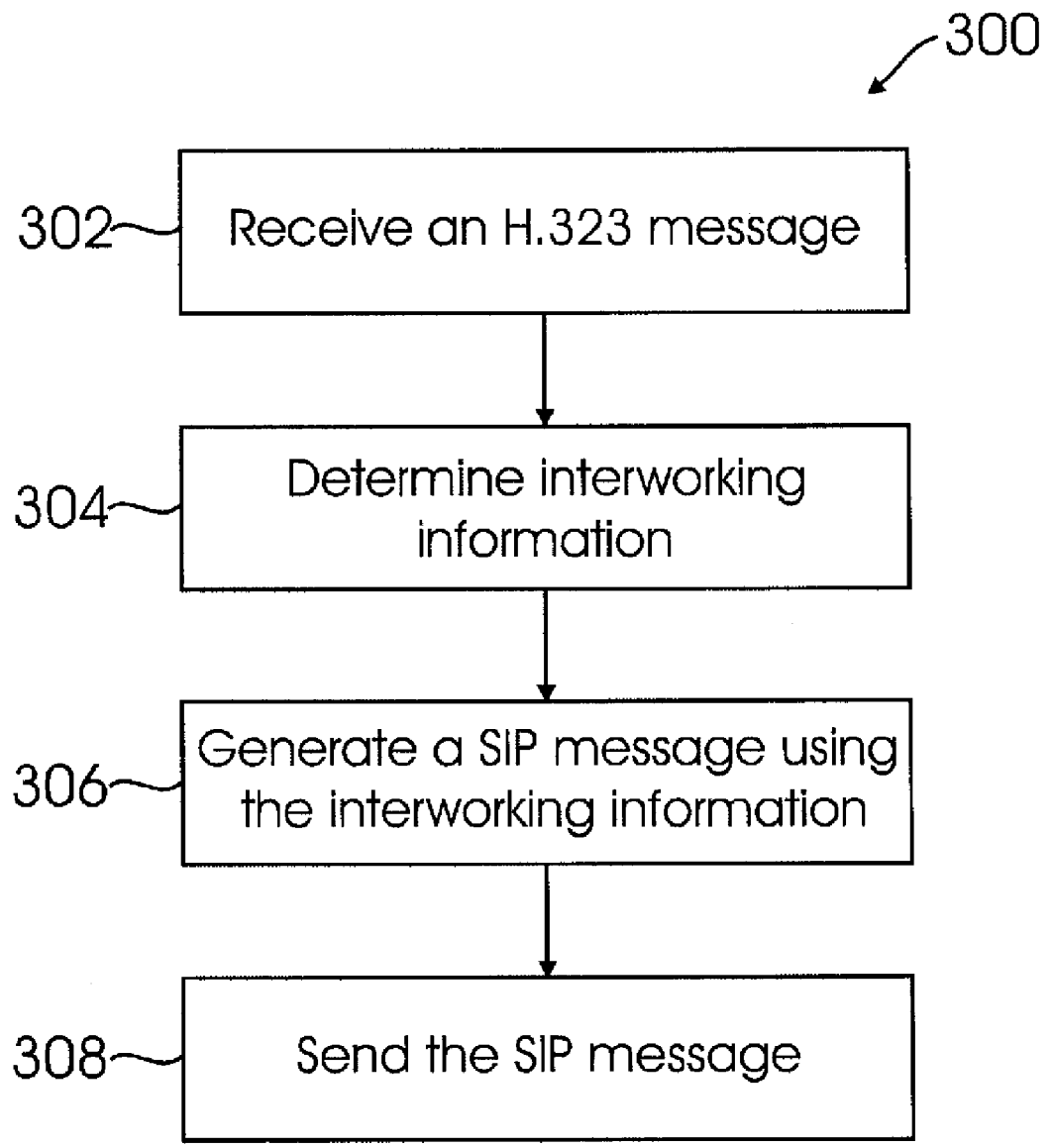
FIG. 3 depicts a simplified flowchart of a method for interworking a H.323 message to a SIP message, according to one embodiment.

Referring to FIGS. 1 and 3, another exemplary method for interworking between the SIP and H323 protocols is provided. In this embodiment, assuming a similar VOIP networking arrangement as the earlier example, gateway 102 receives an H.323 message from end device 104-1 to transfer a call session established between end device 104-1 and end device 104-2 to end device 104-3 (S302). In response, gateway 102 determines interworking information (e.g., identification information for end device 104-3) to effectuate the call transfer (S304). Preferably, gateway 102 generates a SIP message (S306); and sends the SIP message using the interworking information (S308).

The above two simplified interworking methods illustrated in FIGS. 2 and 3 may be used in a blind transfer or consult transfer. It is noteworthy, however, that depending on implementation and network environment additional procedures, messages or methods may be utilized to perform the transfer between the end devices 104. Furthermore, in alternative embodiments, similar methods may be used to support any type of supplementary service between end devices 104.

Referring to FIGS. 4 through 8, exemplary call flows between end devices 104-1, 104-2 and 104-3 are provided to describe various call transfer methods, in accordance with one or more embodiments. The exemplary call flows are disclosed as applicable to blind and consult transfer methods. It should be noted, however, that the exemplary call flows disclosed here are provided by way of example. As such, other call flows such as call forward, call hold, call resume, call park, call pickup and other call related procedures may be utilized to accomplish same or similar results as contemplated here.

Figure 4:
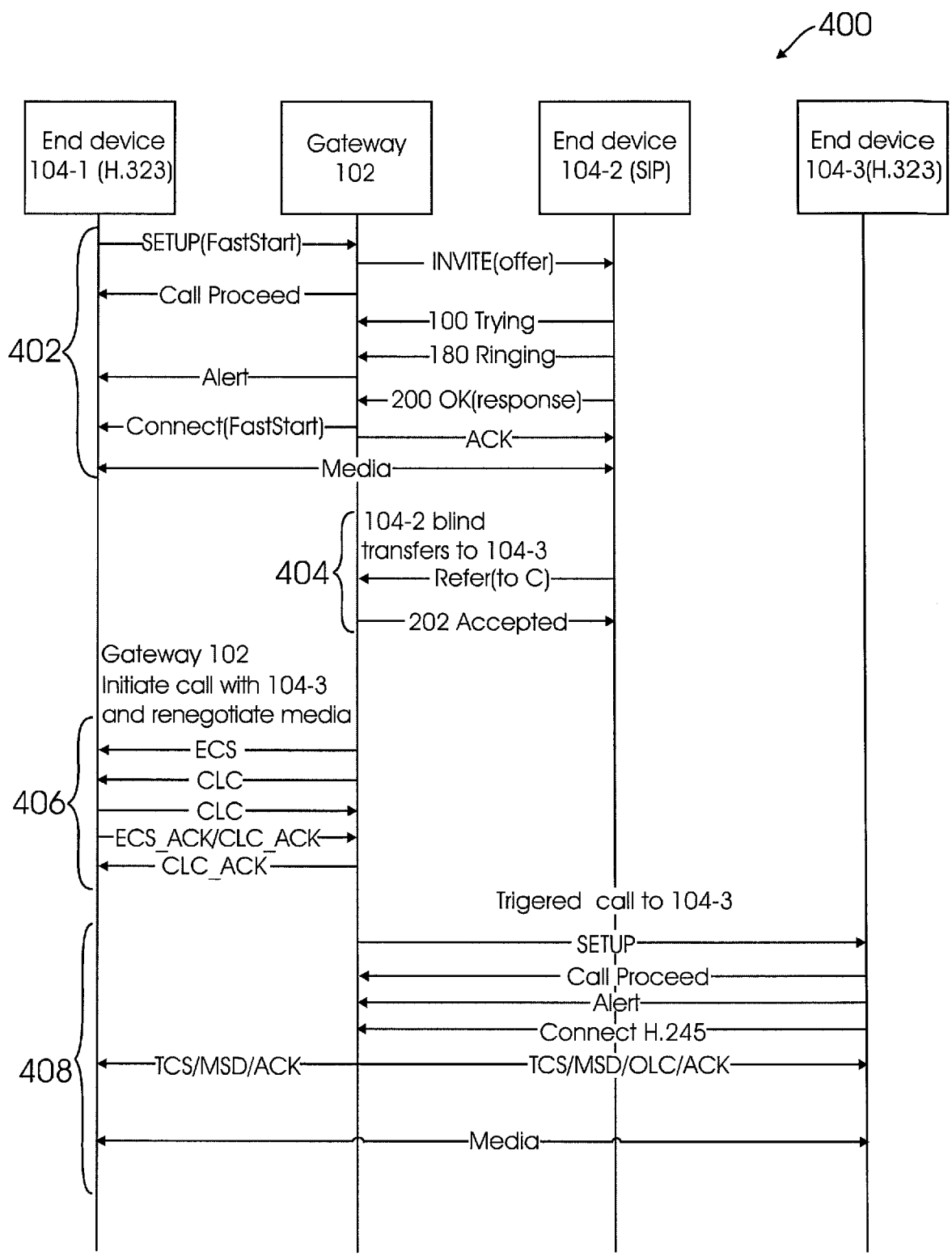
FIG. 4 depicts an exemplary call flow for initiating a blind transfer from an end device communicating over SIP, according to one embodiment.

FIG. 4 illustrates an exemplary flow diagram 400 showing a blind transfer initiated by an end device communicating over SIP, according to one embodiment. End device 104-1, end device 104-2 and end device 104-3 may be member of different networks. End device 104-1 and end device 104-3 preferably communicate over H.323, and end device 104-2 preferably communicates over SIP.

In the following exemplary embodiments, end device 104-2 is the party that initiates the call transfer (i.e., Transferor); end device 104-1 is the party that receives the transfer request (i.e., Transferee); and end device 104-3 is the party to which the call is transferred (i.e., TransferTo). Referring to call flow 402, end device 104-1 sets up a call with end device 104-2. As shown, exemplary H.323 signaling messages (e.g., SETUP) are interworked into SIP messages (e.g., INVITE) to set up the call. Media either flows through or flows around gateway 102 between end device 104-1 and end device 104-2, once the call is established.

Referring to call flow 404, end device 104-2 initiates a call transfer to end device 104-3. As shown, a SIP REFER message is sent from end device 104-2 to gateway 102. The REFER message provides for a blind transfer and, for example, includes an identifier (e.g., C) identifying end device 104-3. The identifier is preferably a unique identifier, such as a telephone number, email address, IP address, username, or any other identifier for an end device. In this exemplary embodiment, the blind transfer is accomplished by way of a SIP "REFER(Refer-to:)" method and the identifier C included in the "Refer-to" field provides the communication address for device 104-3.

To effectuate the call transfer, gateway 102 will attempt to forward the call transfer message to end device 104-1. Since end device 104-1 communicates over H.323, the SIP REFER message generated by end device 104-2 cannot be utilized to communicate directly with end device 104-1. That is, in accordance with one embodiment, end device 104-1 is non-H.450 capable. As such, H.450 methods may not be used for supplementary services. In one embodiment, the ECS message is used for media renegotiations. Accordingly, gateway 102 determines interworking information for generating and sending a H.323 ECS message to end device 104-1.

FIG. 5 depicts an example of a SIP REFER message 500, according to one embodiment. Gateway 102 may parse message 500 to determine information for the ECS message. In one embodiment, gateway 102 determines that end device 104-2, which is identified by "Referred-by" field 506, wants to transfer the call to the identifier included in a "Refer-to" field 504 (e.g., <SIP:2001@1.2.177.3.60). Gateway 102 utilizes the identifier as interworking information. An example of an ECS message 508 (also known as TCS=0) that is generated using the interworking information is provided below.

```
Example of ECS (TCS=0) message:
value MultimediaSystemControlMessage ::= request :
terminalCapabilitySet :
    {
        sequenceNumber 1
    }
Example of TCS message:
value MultimediaSystemControlMessage ::= request :
terminalCapabilitySet :
    {
        sequenceNumber 1
        protocolIdentifier { 0 0 8 245 0 7 }
        multiplexCapability h2250Capability :
        {
            maximumAudioDelayJitter 20
            receiveMultipointCapability
            {
                multicastCapability FALSE
                multiUniCastConference FALSE
                mediaDistributionCapability
                {
                    {
                        centralizedControl FALSE
                        distributedControl FALSE
                        centralizedAudio FALSE
                        distributedAudio FALSE
                        centralizedVideo FALSE
```

-continued

```
            distributedVideo FALSE
          }
       }
    }
    transmitMultipointCapability
    {
       multicastCapability FALSE
       multiUniCastConference FALSE
       mediaDistributionCapability
       {
          {
             centralizedControl FALSE
             distributedControl FALSE
             centralizedAudio FALSE
             distributedAudio FALSE
             centralizedVideo FALSE
             distributedVideo FALSE
          }
       }
    }
    receiveAndTransmitMultipointCapability
    {
       multicastCapability FALSE
       multiUniCastConference FALSE
       mediaDistributionCapability
       {
          {
             centralizedControl FALSE
             distributedControl FALSE
             centralizedAudio FALSE
             distributedAudio FALSE
             centralizedVideo FALSE
             distributedVideo FALSE
          }
       }
    }
    mcCapability
    {
       centralizedConferenceMC FALSE
       decentralizedConferenceMC FALSE
    }
    rtcpVideoControlCapability FALSE
    mediaPacketizationCapability
    {
       h261aVideoPacketization FALSE
    }
    logicalChannelSwitchingCapability FALSE
    t120DynamicPortCapability FALSE
}
capabilityTable
{
    {
       capabilityTableEntryNumber 27
       capability receiveAndTransmitDataApplicationCapability :
       {
          application t38fax :
          {
             t38FaxProtocol udp : NULL
             t38FaxProfile
             {
                fillBitRemoval FALSE
                transcodingJBIG FALSE
                transcodingMMR FALSE
                version 0
                t38FaxRateManagement transferredTCF : NULL
                t38FaxUdpOptions
                {
                   t38FaxMaxBuffer 200
                   t38FaxMaxDatagram 72
                   t38FaxUdpEC t38UDPRedundancy : NULL
                }
             }
          }
          maxBitRate 144
       }
    },
    {
       capabilityTableEntryNumber 22
       capability receiveUserInputCapability : basicString : NULL
    },
```

```
    {
       capabilityTableEntryNumber 11
       capability receiveAudioCapability : g729wAnnexB : 2
    },
    {
       capabilityTableEntryNumber 9
       capability receiveAudioCapability : g7231 :
       {
          maxAl-sduAudioFrames 1
          silenceSuppression FALSE
       }
    },
    {
       capabilityTableEntryNumber 1
       capability receiveAudioCapability : g711Ulaw64k : 20
    },
    {
       capabilityTableEntryNumber 2
       capability receiveAudioCapability : g711Alaw64k : 20
    },
    {
       capabilityTableEntryNumber 8
       capability receiveAudioCapability : g728 : 8
    }
}
capabilityDescriptors
{
    {
       capabilityDescriptorNumber 1
       simultaneousCapabilities
       {
          {
             27,
             1,
             2,
             11,
             9,
             8
          },
          {
             22
          }
       }
    }
}
```

Referring back to FIG. 4, in one embodiment, a SIP REFER message is parsed and interworking information for generating the ECS message is determined. The interworking information is used to generate the ECS message, which is sent from gateway 102 to end device 104-1, as shown in call flow 406, to initiate a call with end device 104-3 and renegotiate media. Accordingly, gateway 102 requests that end device 104-1 to enter a paused state and close one or more logical channels used to communicate with end device 104-2, at which time end device 104-2 may drop out of the call.

The call transfer to end device 104-3 is effectuated in call flow 408. In this exemplary embodiment, gateway 102 initiates a call to end device 104-3. A call is connected and media may flow between end device 104-1 and end device 104-3. Accordingly, the call is transferred from end device 104-2 to end device 104-3 by way a blind transfer and as a result of interworking a SIP REFER message with a H.323 ECS message. As a result, end device 104-1 can establish a media with end device 104-3, when the call with end device 104-2 is terminated.

Figure 6:
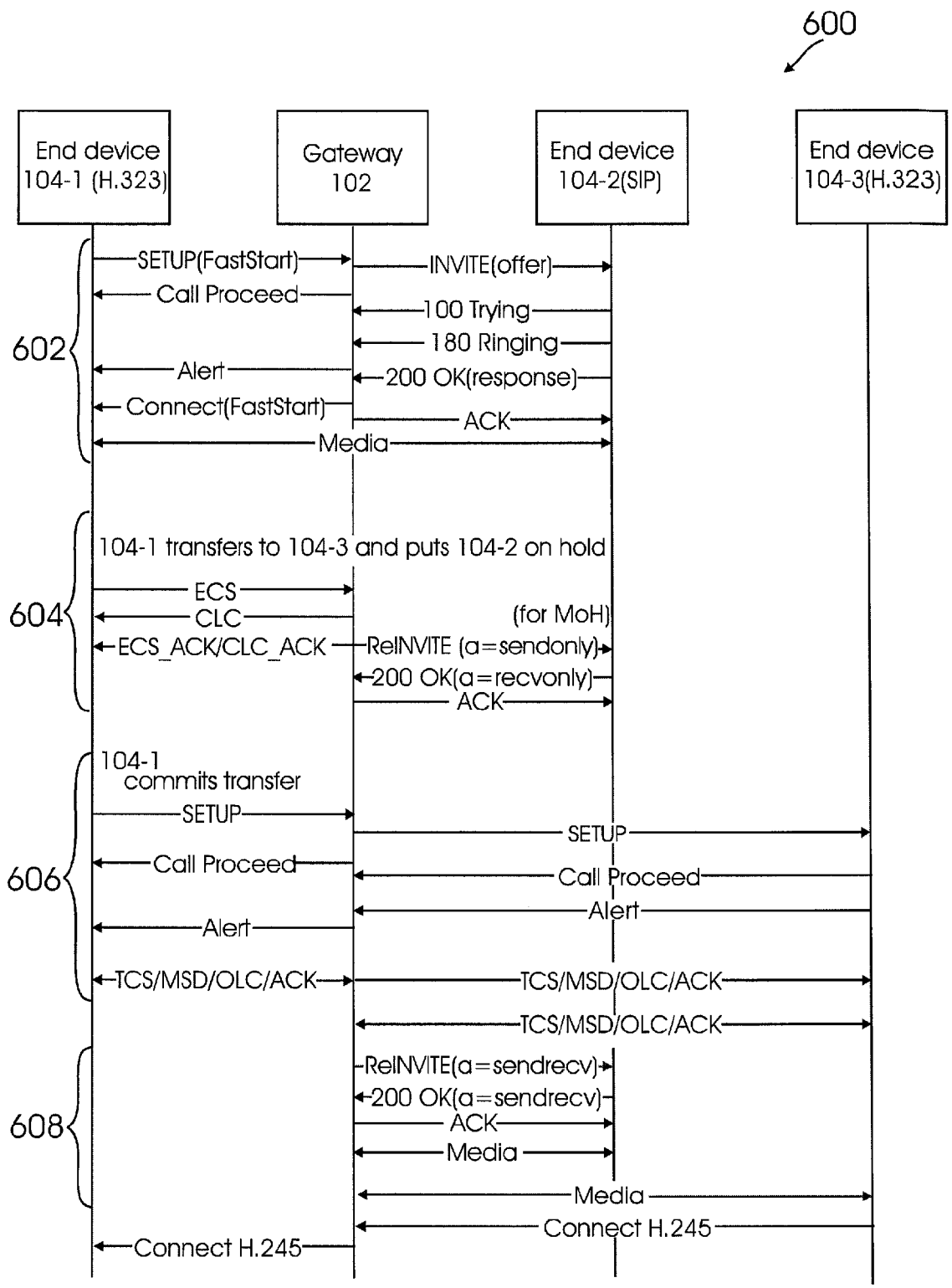
FIG. 6 depicts an exemplary call flow for initiating a blind transfer from an end device communicating over H.323, according to one embodiment.

FIG. 6 illustrates an exemplary flow diagram 600 showing a method for a blind transfer initiated by an end device communicating over H.323, in accordance with one embodiment. In this embodiment, end device 104-1 and end device 104-3 communicate over H.323 protocol and end device 104-2 communicates over SIP. End device 104-1 and end device 104-2 may be participating in a call when end device 104-1 requests a blind transfer to end device 104-3.

In accordance with an exemplary embodiment, call flow 602 illustrates signaling messages for setting up a call between end device 104-1 and end device 104-2. As shown, end device 104-1 sends H.323 messages to gateway 102 which interworks the H.323 messages to SIP messages that are forwarded to end device 104-2. In response to the call being set up, media can flow between end device 104-1 and end device 104-2.

In exemplary call flow 604, end device 104-1 request a call transfer from end device 104-2 to end device 104-3 by generating a new SETUP. Also for media renegotiation and music on hold (MoH), end device 104-1 sends an ECS message to gateway 102. The ECS message is an H.323 message requesting for end device 104-2 to enter a pause state. Gateway 102 interworks the received H.323 ECS message to generate and transmit a SIP ReINVITE (a=sendonly) message to end device 104-2. Upon receiving the ReINVITE message with the "sendonly" attribute, end device 104-2 is placed on hold, with music on hold (MoH) or no music, depending on implementation.

The "sendonly" attribute is utilized to inform the recipient of the ReINVITE message (e.g., end device 104-2) that the transmitter (e.g., end device 104-1) will be sending media and that the transmitter will not be receiving any media. Accordingly, by using the "sendonly" attribute, end device 104-1 puts end device 104-2 on hold.

Referring to exemplary call flow 606, end device 104-1 attempts to set up a call to end device 104-3 to complete the blind transfer. As shown, end device 104-1 may send H.323 messages to gateway 102, and Gateway 102 may send the H.323 messages to end device 104-3 to accomplish the call setup. It is noteworthy that in the exemplary call flow 606, gateway 102 need not interwork messages between H.323 and SIP, because both end devices 104-1 and 104-3 communicate over H.323.

In one embodiment, prior to media flowing between end device 104-1 and end device 104-3, gateway 102 transmits a SIP ReINVITE message with a "sendrecv" attribute to end device 104-2 to release end device 104-2. The "sendrecv" attribute is utilized to indicate that media can flow between the parties (i.e., to remove the on hold status). Once end device 104-2 is released, media flows between end device 104-1 and 104-3.

Figure 7:
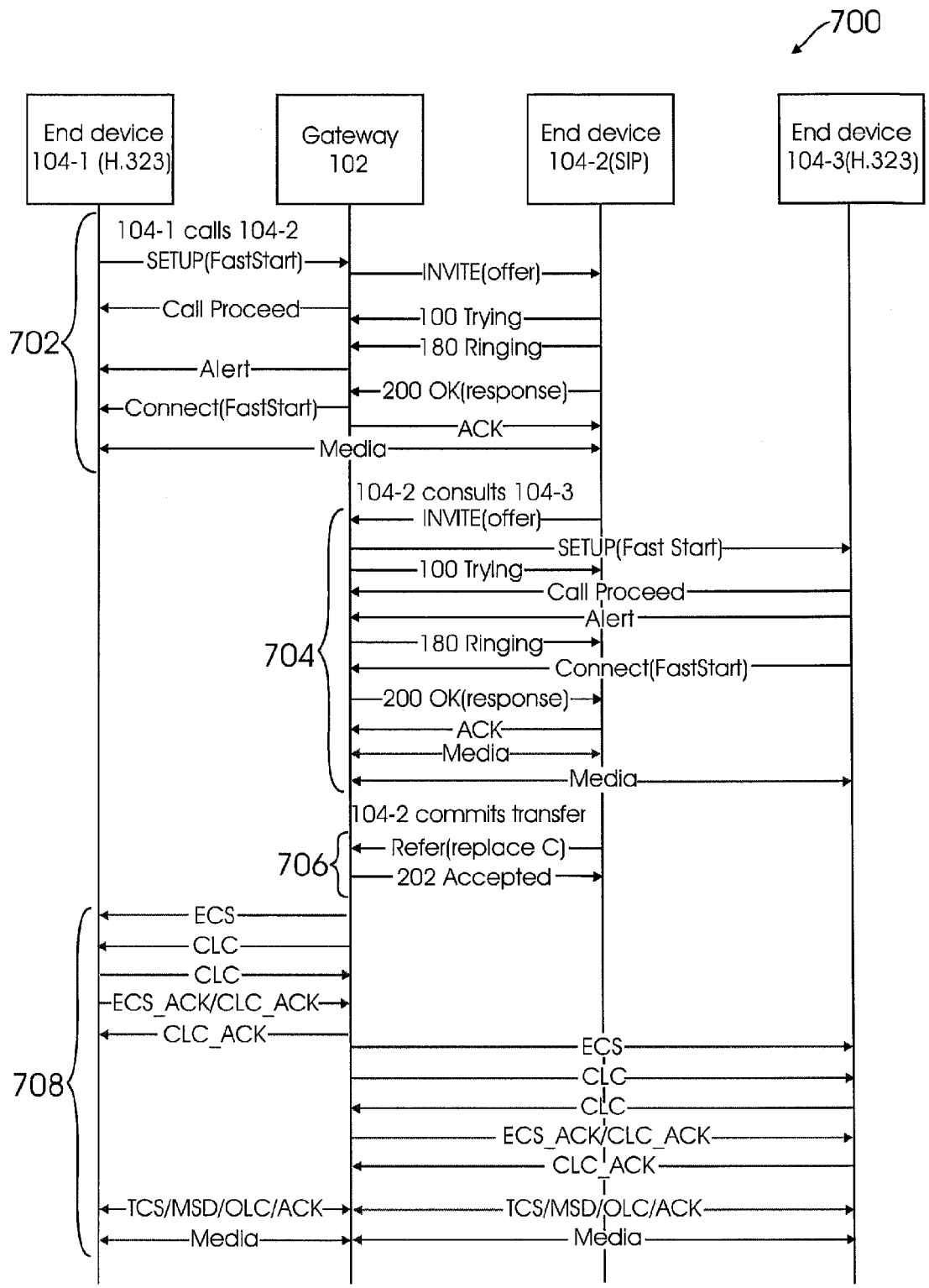
FIG. 7 depicts an exemplary call flow for initiating a consult transfer from an end device communicating over SIP, according to one embodiment.

FIG. 7 illustrates an exemplary flow diagram 700 showing a method for a consult transfer initiated by an end device communicating over SIP, in accordance with one embodiment. In this embodiment, end device 104-1 and end device 104-3 communicate over H.323, and end device 104-2 communicates over SIP. End device 104-1 and end device 104-2 may be participating in a call when end device 104-2 requests a consult transfer to end device 104-3.

In accordance with an exemplary embodiment, call flow 702 shows signaling messages for setting up a call between end device 104-1 and end device 104-2. As shown, end device 104-1 sends H.323 messages to gateway 102 which interworks the H.323 messages with SIP messages that are in turn forwarded to end device 104-2. Media can flow between end device 104-1 and end device 104-2 once the call is set up.

In exemplary call flow 704, a user B, using end device 104-2, may consult with a user C, using end device 104-3, for a call transfer. Preferably, the call with end device 104-1 may be put on hold, with music or no music, while the consult transfer is initiated and proceeds. End device 104-2 sends one or more SIP messages (e.g., INVITE) to gateway 102, and gateway 102 interworks the SIP messages into H.323 messages (e.g., SETUP) to set up a call between end devices 104-2 and 104-3.

Once the call connection is established, media flows between end device 104-2 and end device 104-3 so that, for example, user B can ask user C if user C accepts a call transferred from a user A, using end device 104-1. Referring to exemplary call flow 706, after talking with user C, user B may initiate the call transfer to user C's end device 104-3. In this exemplary scenario, end device 104-2 sends a request for a consult transfer to gateway 102 by way of a SIP REFER message.

The SIP REFER message for a consult transfer may be different from the SIP REFER for a blind transfer. In blind transfer, REFER carries Refer-To address and no replace header as there is no consult call to replace. In consult transfer, REFER carries Refer-To address and also replace header. The Replace header comprises a caller id, a from-tag and a to-tag of the consult call to help uniquely identify the consult call. In one exemplary embodiment, the REFER message has the format "REFER (replace:C)", where C is an identifier for end device 104-3 and the replace header identifies that the call is between end device 104-2 and end device 104-3.

In exemplary call flow 708, gateway 102 transmits an H.323 ECS message to end devices 104-1 and 104-3 to place said end devices in a paused state, while end device 104-2 is being released and a call between end devices 104-1 and 104-3 is being established. Media can then flow between end device 104-1 and end device 104-3.

Figure 8:
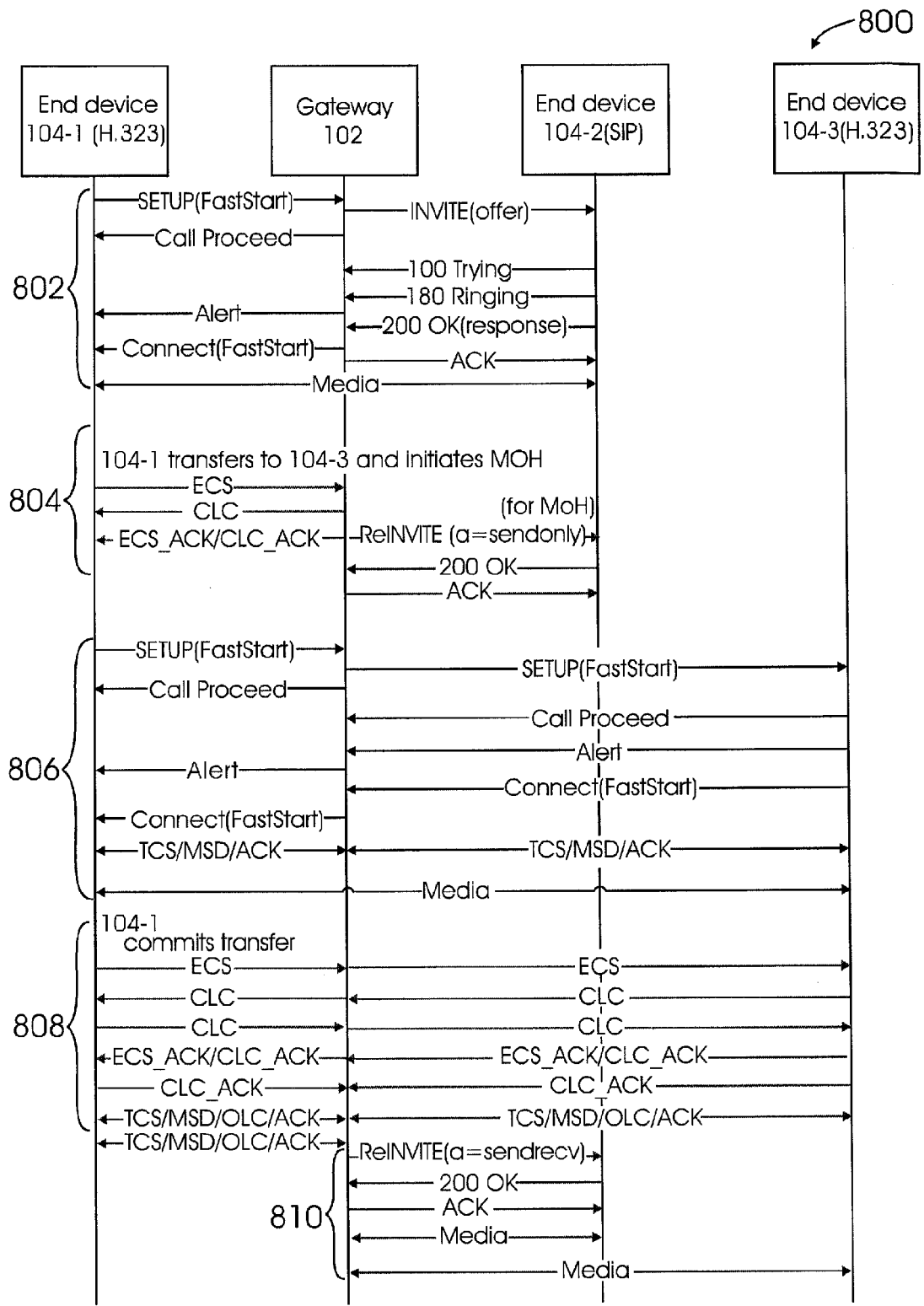
FIG. 8 depicts an exemplary call flow for initiating a consult transfer from an end device communicating over H.323, according to one embodiment.

FIG. 8 illustrates an exemplary flow diagram 800 showing a method for a consult transfer initiated by an end device communicating over H323, in accordance with one embodiment. As shown, end device 104-1 and end device 104-3 communicate over H.323 protocol and end device 104-2 communicates over SIP. End device 104-1 and end device 104-2 may be participating in a call when end device 104-1 requests a consult transfer for end device 104-2 to transfer the call to end device 104-3.

In accordance with an exemplary embodiment, call flow 802 shows signaling messages for setting up a call between end device 104-1 and end device 104-2. As shown, end device 104-1 sends H.323 messages to gateway 102 which interworks the H.323 messages with SIP messages forwarded to end device 104-2. Media can then flow between end device 104-1 and end device 104-2 after the call is set up.

In exemplary call flow 804, end device 104-1 requests a call transfer from end device 104-2 to end device 104-3 by generating and sending an ECS message to gateway 102. The ECS message is an H.323 message requesting for end device 104-2 to enter a paused state. Gateway 102 interworks the received H.323 ECS message to generate and transmit a ReINVITE (a=sendonly) SIP message to end device 104-2. Upon receiving the ReINVITE message with the "sendonly" attribute, end device 104-2 is placed on hold, with music or no music, depending on implementation.

In exemplary call flow 806, end device 104-1 attempts to set up a call to end device 104-3 to complete the consult transfer. As shown, end device 104-1 may send H.323 messages to gateway 102, and since both end devices 104-1 and 104-3 communicated over H.323, gateway 102 can send the H.323 messages to end device 104-3, preferably without interworking, to accomplish the call setup. Once the connection is established, media flows between end devices 104-1 and 104-3, as shown.

Referring to exemplary call flow 808, in response to end device 104-1 transmitting an ECS message to end device 104-3, end device 104.2 commits the call transfer. CLC messages communicated between end devices 104-1 and 104-3 cause logical channels between the end devices to be closed. In exemplary call flow 810, gateway 102 transmits a SIP ReINVITE message with a "sendrecv" attribute to end device 104.2 to release end device 104-2. Once end device 104-2 is released, media flows between end device 104-2 and 104-3.

Although a full consult transfer is described above with reference to one or more exemplary embodiments, it is noteworthy that a semi-consult transfer also known as "consult at alert" may be supported in a similar manner, where the transfer is committed, in response to end device 104-2 being alerted, instead of waiting for connection.

It should be noted that the above exemplary call flows are for a media flow-around where media flows, preferably, directly between the end devices 104 as controlled by gateway 102. A person skilled in the art would appreciate that call flows may be also supported for scenarios where media flows indirectly between the end devices 104, through gateway 102. In such a case, identification information for gateway 102 (e.g., gateway's address and RTP ports) may be included in the media being sent. Such information can be used to terminate and re-originate media with end devices 104.

In accordance with one or more embodiments, in both media flow around and media flow through scenarios, signaling preferably flows via gateway 104 to accommodate the interworking between H.323 and SIP networks. Each H.323 or SIP message is parsed to generate a message that can be mapped to a corresponding message in the counterpart protocol. As provided above, one or more exemplary embodiments support mapping between H.323 ECS, SIP REFER and SIP ReINVITE messages. Gateway 102 can intelligently determine which information is needed to interwork the messages for different protocols to complete a call transfer between end devices 104.

Figure 9:
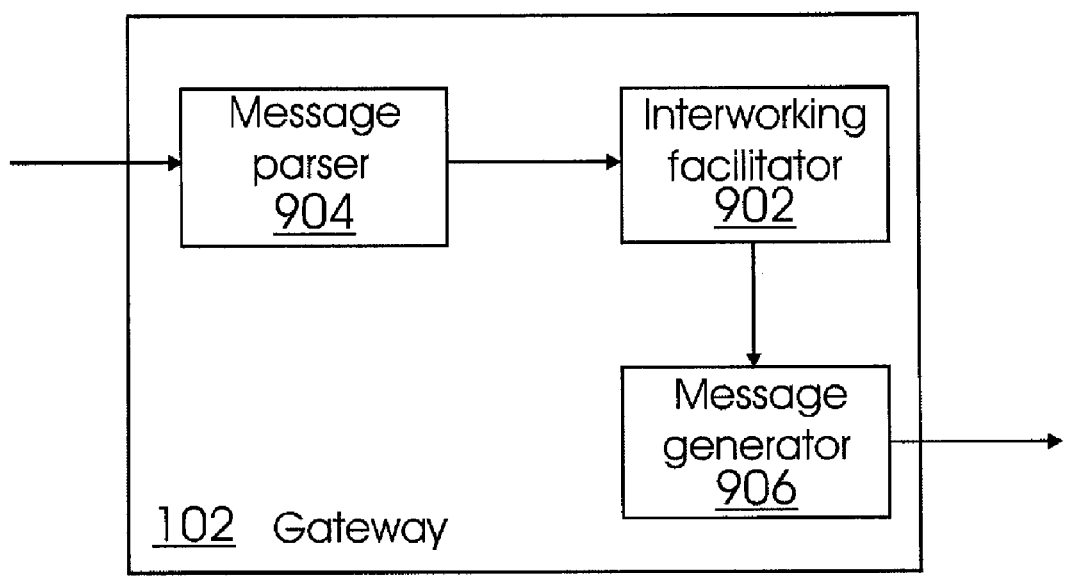
FIG. 9 is a simplified block diagram of exemplary components of a gateway, according to one embodiment.

FIG. 9 depicts an exemplary embodiment of gateway 102, in accordance with one aspect of the invention. As shown, gateway 102 may comprise an interworking facilitator 902, a message parser 904 and a message generator 906. Message parser 904 determines interworking information from the message received. Message parser 904 may, for example, include logic that intelligently parses fields of a message and determines interworking information.

In one embodiment, message parser 904 can parse an H.323 message and determine the information for generating a counterpart SIP message. Further, message parser 904 can parse a SIP message and determine the information for generating a counterpart H.323 message. For example, message parser 904 may determine an identifier for the end device 104 to which the call will be transferred or other information needed to complete the transfer over the respective VOIP protocols.

In one embodiment, interworking facilitator 902 is configured to determine when a call transfer is requested. For example, interworking facilitator 902 may determine whether a SIP REFER or ReINVITE message or a H.323 ECS message for a call transfer is received. Message generator 906 preferably generates a message that can be mapped to a counterpart message in a corresponding protocol. For example, if the call transfer message is an H.323 message, message generator 906 may generate a SIP REFER or ReINVITE message using the interworking information. Message generator 906 then sends the generated SIP message.

Although the invention has been described with respect to specific exemplary embodiments, these exemplary embodiments are merely illustrative and not restrictive of the invention. For example, the principals and conventions disclosed herein may be used for interworking messages between protocols other than SIP and H.323.

Any suitable programming language can be used to implement the processes, steps, or routines discussed with reference to the above exemplary embodiments. Such programming languages may include C, C++, Java, assembly language, etc. Different programming techniques (e.g., procedural or object oriented) may be employed. The routines can be executed on a single processing device or multiple processors. Although certain steps, operations or computations may have been presented in a specific order in the above exemplary embodiments, this order is not of particular importance unless stated otherwise.

For example, in some embodiments of the invention, multiple steps in a process are shown as sequential. However, in alternative embodiments, such steps may be performed concurrently or in a different sequence. The sequence of operations described herein can be interrupted, suspended or otherwise controlled by another process, such as an operating system, a kernel, a virtual machine, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

Numerous specific details have been provided, such as examples of components and methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials or operations are not specifically shown or described in detail to avoid obscuring aspects of embodiments of the present invention.

A "computer-readable medium" for purposes of embodiments of the present invention may be any medium that can contain, store, communicate, propagate or transport the program for use by or in connection with the instruction execution system, apparatus, system or device. The computer readable medium can be, by way of example, an electronic, magnetic, optical, electromagnetic, infrared, or semiconductor system, apparatus, system, device, propagation medium or computer memory.

Certain embodiments of the present invention can be implemented in the form of control logic in software or hardware or a combination of both. The control logic may be stored in an information storage medium, such as a computer-readable medium, as a plurality of instructions adapted to direct an information processing device to perform a set of steps as disclosed in one or more embodiments. Based on the disclosure and teachings provided here, a person of ordinary skill in the art will appreciate that other ways and/or methods may be implemented to accomplish the same or similar results as contemplated herein.

A "processor" or "process," as used herein, may comprise any human, hardware and/or software system, mechanism or component that processes data, signals or other information. A processor can include a system with a general-purpose central processing unit, multiple processing units, dedicated circuitry for achieving functionality or other systems. Processing need not be limited to a geographic location, or have temporal limitations. For example, a processor can perform its functions in "real time," "offline," in a "batch mode," etc.

Portions of processing can be performed at different times and at different locations, by different (or the same) processing systems, for example.

References throughout this specification to "one embodiment," "an embodiment," or "a specific embodiment" mean that a particular feature, structure or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures or characteristics of any specific embodiment of the present invention may be combined in any suitable manner with one or more other embodiments. It is to be understood that other variations and modifications of the embodiments described and illustrated herein are possible in light of the teachings herein and are to be considered as part of the spirit and scope of the present invention.

One or more embodiments may be implemented by using a programmed general-purpose digital computer, by using application specific integrated circuits, programmable logic devices, field programmable gate arrays, optical, chemical, biological, quantum or nanoengineered systems, components and mechanisms. In general, the disclosed functions can be achieved by any means as is known in the art. Distributed, or networked systems, components and circuits can be used to implement one or more embodiments. Communication or transfer of data may be accomplished over wired or wireless communication lines, or by any other means.

It also will be appreciated that one or more of the elements depicted in the drawings can also be implemented in more or less detail, or even removed or rendered as inoperable in certain cases, as is useful in accordance with a particular application. It is also within the spirit and scope of the invention to implement a program or code that can be stored in a machine-readable medium to permit a computer to perform any of the methods described above.

Additionally, any signals in the drawings should be considered as exemplary, and not limiting, unless otherwise specifically noted. Furthermore, the term "or" as used herein is generally intended to be non-exclusive to mean "and/or," unless otherwise indicated. Combinations of components or steps will also be considered as being noted, where terminology is foreseen as rendering the ability to separate or combine is unclear.

While the present invention has been described herein with reference to particular embodiments thereof, a latitude of modification, various changes and substitutions are intended in the foregoing disclosures, and it will be appreciated that in some instances some features of certain embodiments will be employed without a corresponding use of other features and without departing from the scope and spirit of the invention as set forth. Therefore, some modifications may be made to adapt a particular situation or material to the essential scope and spirit of the invention.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method comprising:
receiving, during a call between a first end device and a second end device, a SIP REFER message for the second end device to transfer the call to a third end device, wherein the first end device and the third end device communicate over the H.323 protocol, and the second end device communicates over the SIP protocol;
determining interworking information to interwork the SIP REFER message with a H.323 message, wherein the determining uses a replace header in the REFER message for a consult transfer;
generating a first H.323 ECS message based on the interworking information, such that the H.323 ECS message initiates the call transfer to the third end device, wherein the interworking information comprises an identifier uniquely identifying the third end device and wherein the identifier is included the first H.323 ECS message;
transmitting the first H.323 ECS message to the first end device to place the first end device in a paused state;
transmitting a first close logical channel (CLC) message to the first end device;
transmitting a second H.323 ECS message to the third end device to place the third end device in a paused state;
transmitting a second CLC message to the third end device; and
establishing a call between the first end device and the third end device.

2. The method of claim 1, wherein the receiving, determining, generating and transmitting processes are performed by a gateway connecting the first end device to the second end device.

3. The method of claim 2, wherein the SIP REFER message is received from the second end device.

4. The method of claim 1, wherein the first end device receives the first H.323 ECS message and effectuates a call transfer to the third end device based on the identifier included in the first H.323 ECS message.

5. The method of claim 1, wherein the call transfer is performed by way of a blind transfer.

6. The method of claim 1, wherein the call transfer is performed by way of a consult transfer.

7. The method of claim 1, wherein the call transfer is performed by way of a semi-consult transfer.

8. A method comprising:
receiving, during a call between a first end device and a second end device, a H.323 ECS message for the first end device to transfer the call to a third end device, wherein the first end device and the third end device communicate over the H.323 protocol, and the second end device communicates over the SIP protocol;
determining interworking information to interwork the H.323 ECS message to a SIP message;
generating a first SIP ReINVITE message based on the interworking information, such that the first SIP ReINVITE message initiates the call transfer to the third end device, wherein the interworking information comprises an identifier uniquely identifying the third end device and wherein the identifier is included the first SIP ReINVITE message;
transmitting the first SIP ReINVITE message to the second end device to place the second end device in a paused state;
transmitting a first close logical channel (CLC) message to the first end device;
transmitting a second CLC message to the third end device;

transmitting a second SIP ReINVITE message to the second end device to release the second end device; and establishing a call between the second end device and the third end device.

9. The method of claim 8, wherein the receiving, determining, generating and transmitting processes are performed by a gateway connecting the first end device to the second end device.

10. The method of claim 8, wherein the second end device receives the first SIP ReINVITE message and effectuate a call transfer to the third end device based on the identifier included in the first SIP ReINVITE message.

11. The method of claim 8, wherein the call transfer is performed by way of a blind transfer.

12. The method of claim 8, wherein the call transfer is performed by way of a consult transfer.

13. The method of claim 8, wherein the call transfer is performed by way of a semi-consult transfer.

* * * * *